United States Patent
Um et al.

(10) Patent No.: US 12,276,885 B2
(45) Date of Patent: Apr. 15, 2025

(54) ARRAY SUBSTRATE AND DISPLAY PANEL

(71) Applicant: TCL CHINA STAR OPTOELECTRONICS TECHNOLOGY CO., LTD., Guangdong (CN)

(72) Inventors: Yoonsung Um, Guangdong (CN); Shuang Wang, Guangdong (CN); Jinming Liu, Guangdong (CN); Fan Gao, Guangdong (CN); Wu Cao, Guangdong (CN); Hongyuan Xu, Guangdong (CN); Chungching Hsieh, Guangdong (CN)

(73) Assignee: TCL CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/484,434

(22) Filed: Oct. 10, 2023

(65) Prior Publication Data

US 2025/0060634 A1    Feb. 20, 2025

(30) Foreign Application Priority Data

Aug. 18, 2023    (CN) .......................... 202311049604.0

(51) Int. Cl.
*G02F 1/1343*     (2006.01)
*G02F 1/1362*     (2006.01)

(52) U.S. Cl.
CPC .. *G02F 1/134309* (2013.01); *G02F 1/136286* (2013.01)

(58) Field of Classification Search
None
See application file for complete search history.

(56) References Cited

U.S. PATENT DOCUMENTS

| 2005/0046764 A1* | 3/2005 | Enda ................. G02F 1/136286 349/43 |
| 2010/0103360 A1* | 4/2010 | Shimomaki ....... G02F 1/134363 349/141 |

(Continued)

FOREIGN PATENT DOCUMENTS

| CN | 113936564 A | 1/2022 |
| EP | 2587306 A1  | 5/2013 |

OTHER PUBLICATIONS

German Office Action issued in corresponding German Patent Application No. 10 2023 133 384.4 dated Mar. 12, 2024, pp. 1-5.

(Continued)

*Primary Examiner* — Sang V Nguyen
(74) *Attorney, Agent, or Firm* — PV IP PC; Wei Te Chung

(57) ABSTRACT

An array substrate and a display panel are provided. The array substrate includes a substrate, and at least three pixel unit. The pixel unit includes at least one pixel group and at least three data line groups disposed on the substrate. Each pixel group includes six sub-pixels arranged at intervals in a first direction. Each sub-pixel includes at least one pixel electrode. The at least three data line groups include three data line groups. Each data line group corresponds to a pixel electrode of one sub-pixel. The data line group is located on one side of the pixel electrode which is adjacent to the substrate. Each data line group includes two data lines arranged at intervals in the first direction. The pixel electrode of each sub-pixel is electrically connected to one data line.

20 Claims, 8 Drawing Sheets

(56) References Cited

U.S. PATENT DOCUMENTS

| | | | |
|---|---|---|---|
| 2011/0157504 A1* | 6/2011 | Kimura | G09G 3/3648 |
| | | | 349/38 |
| 2012/0068916 A1* | 3/2012 | Tsubata | G02F 1/1362 |
| | | | 345/94 |
| 2013/0070002 A1* | 3/2013 | Hisada | G09G 5/10 |
| | | | 362/231 |
| 2019/0131320 A1* | 5/2019 | Shin | G02F 1/134336 |
| 2019/0259324 A1* | 8/2019 | Liu | G09G 3/2003 |
| 2020/0074946 A1 | 3/2020 | Lim et al. | |
| 2022/0276539 A1* | 9/2022 | Long | G02F 1/136286 |

OTHER PUBLICATIONS

Eurasian Office Action issued in corresponding Eurasian Patent Application No. 202393202 dated Jan. 11, 2024, p. 1.
European Office Action issued in corresponding European Patent Application No. 23205452.8 dated Apr. 4, 2024, pp. 1-10.

\* cited by examiner

ARRAY SUBSTRATE AND DISPLAY PANEL

CROSS-REFERENCE TO RELATED APPLICATION

This application claims priority to and the benefit of Chinese Patent Application No. 202311049604.0, filed on Aug. 18, 2023, the disclosure of which is incorporated herein by reference in its entirety.

TECHNICAL FIELD

The present disclosure relates to display technologies, and more particular, to an array substrate and a display panel.

BACKGROUND

Liquid crystal display (LCD) panels have many advantages, such as thin body, power saving, and no radiation, and have been widely used, which is dominant in the field of flat panel display. An operation principle of the liquid crystal display panel is that liquid crystal molecules are poured between a Thin Film Transistor (TFT) array substrate and a Color Filter (CF) substrate, and driving voltages are applied to these two substrates to control rotation directions of the liquid crystal molecules so as to refract light rays of the backlight module to generate an image.

A conventional liquid crystal display panel needs to be provided with a Black Matrix (BM) on one side of a CF substrate for light shielding. When the BM is applied to a curved liquid crystal display panel, that the panel is bent will cause the position of the BM to be shift, thus causing light leakage and color deviation. To solve this problem, it is possible to decrease the use of Data BM less (DBS) technology. In this DBS technology, DBS electrodes of the same layer as pixel electrodes are provided on data lines of an array substrate, and a voltage difference-free state is maintained between the DBS electrodes and a common electrode on the CF substrate, so that the liquid crystals between the DBS electrodes and the common electrode do not rotate to assume a black state, thereby replacing the BM for light shielding. However, the presence of the DBS electrodes restricts the increase of an aperture rate of the liquid crystal display panel.

SUMMARY

In view of the above, some embodiments of the present disclosure provides an array substrate and a display panel, to alleviate the technical problem that the aperture rate of an existing liquid crystal display panel is limited to be improved.

To solve the above problems, some embodiments of the present disclosure provide the following technical solutions.

According to some embodiments of the present disclosure, it is provided an array substrate including: a substrate and at least one pixel unit. The at least one pixel unit includes: at least one pixel group disposed on the substrate, and at least three data line groups disposed on the substrate. The at least three data line groups include three data line groups. Each of the at least one pixel group comprising six sub-pixels arranged at intervals in a first direction, and each of the six sub-pixels comprising at least one pixel electrode; and each of the three data line groups corresponds to the at least one pixel electrode of one of the six sub-pixels, and each of the three data line groups is located on one side of the at least one pixel electrode which is adjacent to the substrate; in which each of the three data line groups includes two data lines arranged at intervals in the first direction, and the at least one pixel electrode of each of the six sub-pixels is electrically connected to a respective one of the two data lines of a corresponding one of the three data line groups.

In some embodiments, each of the at least one pixel electrode includes a first backbone electrode extending in a second direction, and the first backbone electrode and a corresponding one of the three data line groups are disposed oppositely.

In some embodiments, an orthographic projection of the first backbone electrode on the substrate covers an orthographic projection of the corresponding one of the three data lines on the substrate.

In some embodiments, the first backbone electrode includes: a first sub-portion corresponding to one of the two data lines of the corresponding one of the three data line groups; and a second sub-portion corresponding to an other one of the two data lines of the corresponding one of the three data line groups.

In some embodiments, each of the at least one pixel electrode further includes a second backbone electrode extending in the first direction, and the first sub-portion and the second sub-portion are both electrically connected to the second backbone electrode.

In some embodiments, the two data lines of each of the three data line groups are of polyline shapes.

In some embodiments, each of the six sub-pixels further includes at least one transistor electrically connected to the at least one pixel electrode of a respective one of the six sub-pixels, the at least one transistor is electrically connected to a respective one of the two data lines of a corresponding one of the three data line groups; for each of the at least one pixel group, the at least one transistor of each of ones of the six sub-pixels is located on a first side of the pixel group, and the at least one transistor of each of other ones of the six sub-pixels is located on a second side of the pixel group, and the first side is opposite to the second side.

In some embodiments, the array substrate further includes a first gate scan line and a second gate scan line extending in the first direction, in which the first gate scan line is electrically connected to a gate of the at least one transistor of each of the ones of the six sub-pixels on the first side, and the second gate scan line is electrically connected to a gate of the at least one transistor of each of the other ones of the six sub-pixels on the second side.

In some embodiments, the at least one pixel group includes a plurality of pixel groups arranged at intervals in a second direction; the array substrate further includes third gate scan lines extending in the first direction, and every adjacent two of the plurality of pixel groups share one of the third gate scan lines.

In some embodiments, the array substrate further includes a plurality of common electrode lines extending in a second direction, in which the plurality of common electrode lines are disposed in a same layer as the two data lines of each of the three data line groups, and each of the common electrode lines is disposed a gap between every adjacent two of the six sub-pixels.

In some embodiments, the six sub-pixels include two first color sub-pixels, two second color sub-pixels, and two third color sub-pixels; one of the three data line groups and one of the two first color sub-pixels are arranged correspondingly, other two of the three data line groups and the two second color sub-pixels are arranged correspondingly respectively, and the two data lines of each of the three data line groups are each electrically connected to the at least one pixel electrode of a corresponding one of two, which are of a same color, of the six sub-pixels.

In some embodiments, voltage polarities of the two data lines of each of the three data line groups are different.

In some embodiments, the two first color sub-pixels are blue sub-pixels, the two second color sub-pixels are green sub-pixels, and the two third color sub-pixels are red sub-pixels; the three data line groups include a first data line group, a second data line group, and a third data line group; the first data line group and one of the two first color sub-pixels are arranged correspondingly; the second data line group and the third data line group, and the two second color sub-pixels are arranged correspondingly respectively; the two data lines of the first data line group are each electrically connected to the at least one pixel electrode of a corresponding one of the two second color sub-pixels, the two data lines of the second data line group are each electrically connected to the at least one pixel electrode of a corresponding one of the two third color sub-pixels, and the two data lines of the third data line group are each electrically connected to the at least one pixel electrode of a corresponding one of the two first color sub-pixels.

In some embodiments, one of the two first color sub-pixels and one of the two second color sub-pixels are adjacent to the two third color sub-pixels and located between the two third color sub-pixels, the one of the two first color sub-pixels and one of the two third color sub-pixels are adjacent to the two second color sub-pixels and located between the two second color sub-pixels; an other one of the two second color sub-pixels and the one of the two third color sub-pixels are adjacent to the two first color sub-pixels and located between the two first color sub-pixels; for each of the two first color sub-pixels, each of the two second color sub-pixels and each of the two third color sub-pixels, the first color sub-pixel, the second color sub-pixel, and the third color sub-pixel are sequentially arranged at intervals in the first direction.

In some embodiments, the at least three data line groups further include a fourth data line group, the fourth data line group and an other one of the two first color sub-pixels are arranged correspondingly, and the fourth data line group has a same structure as the first data line group.

According to some embodiments of the present disclosure, it is also provided a display panel including any array substrate according to previous embodiments.

Advantageous effects of some embodiments of the present disclosure are as follows. In the array substrate and the display panel provided in some embodiments of the present disclosure, the array substrate includes a substrate, and at least one pixel unit. The pixel unit includes at least one pixel group and at least three data line groups disposed on the substrate. Each pixel group includes six sub-pixels arranged at intervals in a first direction, each of the six sub-pixels includes at least one pixel electrode, each of the three data line groups corresponds to of the at least one pixel electrode of one of the six sub-pixels, the three data line groups are located on one side of the six pixel electrodes which is adjacent to the substrate, each of the three data line groups includes two data lines arranged at intervals in the first direction, and the at least one pixel electrode of each of the sub-pixels is electrically connected to one data line. According to some embodiments of the present disclosure, by arranging data lines below pixel electrodes, DBS electrodes can be removed, so that aperture rates of sub-pixels can be significantly improved, thereby solving a technical problem that an aperture rate of an existing liquid crystal display panel is limited to be improved.

BRIEF DESCRIPTION OF THE DRAWINGS

In order that the embodiments or the technical solutions in the related art may be described more clearly, reference will now be made to the accompanying drawings which are to be used in the description of the embodiments or the related art, It will be apparent that the accompanying drawings in the description are merely exemplary of the disclosure, and that other drawings may be made to those skilled in the art without involving any inventive effort.

DETAILED DESCRIPTION

Figure 1:
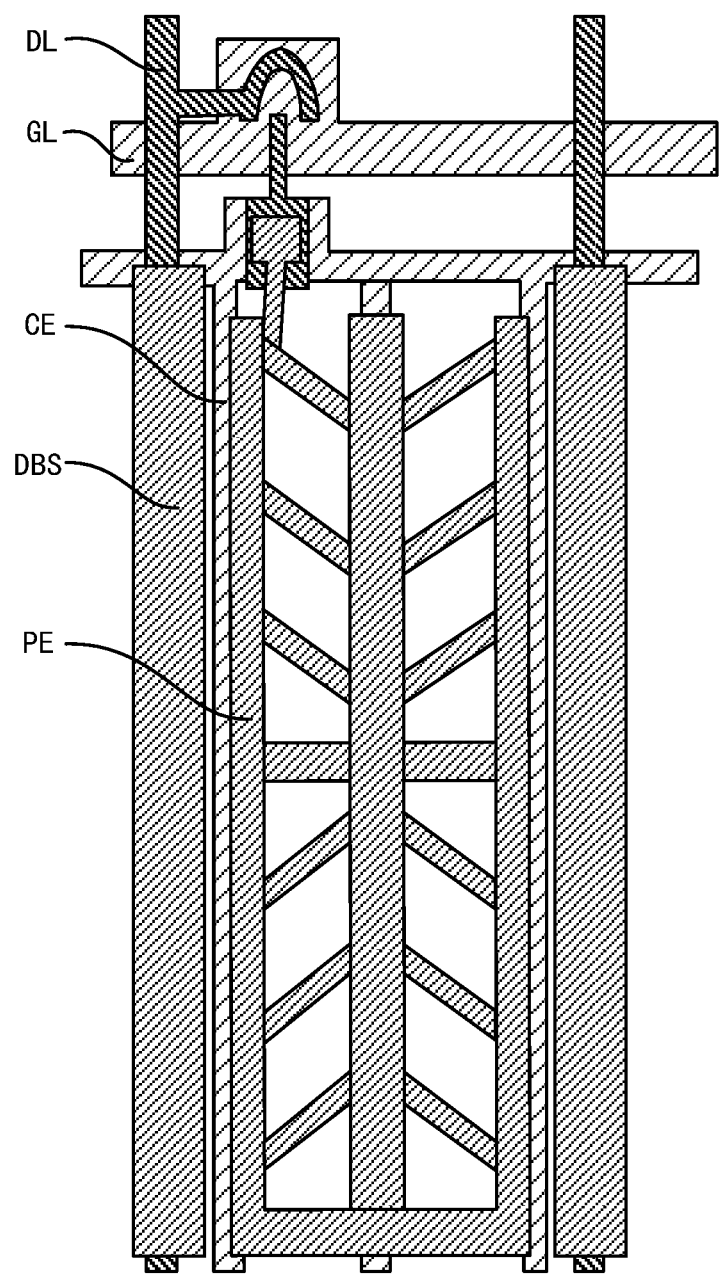
FIG. 1 is a top schematic view of a pixel structure in the related art.

The following description of the embodiments is made with reference to the accompanying drawings to illustrate specific embodiments in which the present disclosure may be implemented. The direction terms mentioned in the present disclosure, such as [upper], [lower], [front], [rear], [left], [right], [inner], [outer], [side], and the like, are only directions by referring to the additional drawings. Thus, the directional language is used to illustrate and understand the present disclosure, and not to limit the present disclosure. In the drawings, structurally similar elements are denoted by the same reference numerals. In the drawings, the thickness of some layers and regions is exaggerated for clarity of understanding and easy description. That is, the dimensions and thickness of each component shown in the drawings are arbitrarily shown, but the present disclosure is not limited thereto.

In view of the problem that an aperture rate of the conventional liquid crystal display panel is limited to be improved, inventors of the present disclosure have found that, in the related art, a Data BM less (DBS) technology is mainly used on a data line, so that DBS electrodes occupies a part of a pixel space, thereby affecting the improvement of the pixel aperture rate.

Specifically, referring to FIG. 1, DBS electrodes are provided in the same layer as pixel electrodes PEs, the DBS electrodes cover a corresponding data line DL, and a width of the DBS electrode is larger than a width of the data line DL. A part of common electrode CE is provided at a gap between the DBS electrode and the pixel electrode PE, another part of the common electrode CE is further provided below a backbone electrode of the pixel electrode PE, and the common electrode CE is provided in the same layer as a gate scan line GL. A combined shading design of the DBS electrodes and the common electrode CE results in a large reduction in an effective display area of the liquid crystal display panel, thereby seriously reducing the aperture rate. Consequently, the improvement of the aperture rate of the liquid crystal display panel is restricted.

To this end, some embodiments of the present disclosure provide an array substrate and a display panel to solve the above-mentioned problem that the aperture rate is limited to be improved.

Figure 2:
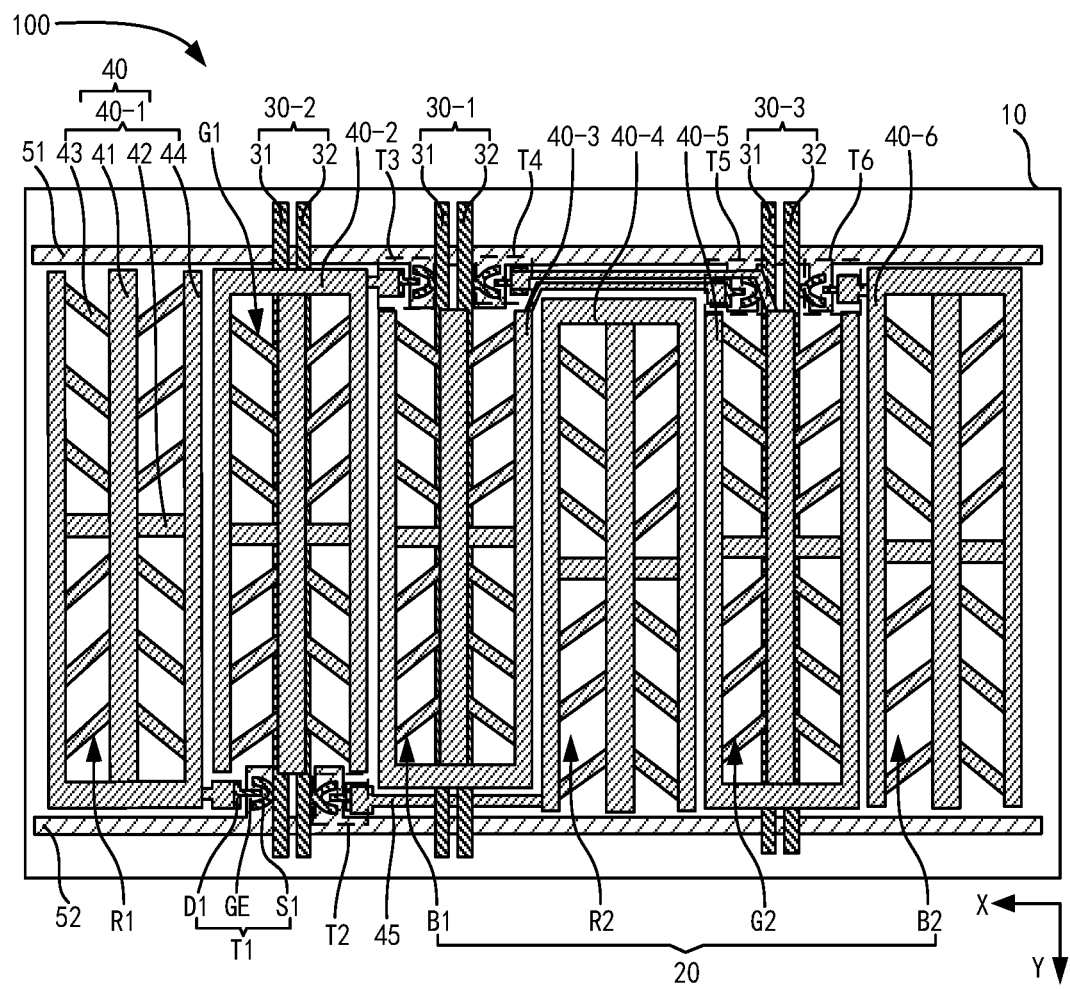
FIG. 2 is a schematic top view of an array substrate according to embodiments of the present disclosure.

Referring to FIGS. 1 to 2, FIG. 2 is a schematic top view of an array substrate according to embodiments of the present disclosure. Referring to FIG. 2, an array substrate 100 includes a substrate 10 and at least one pixel group 20 and at least three data line groups (e.g., a first data line group 30-1, a second data line group 30-2, a third data line group 30-3, and a fourth data line group 30-4) disposed on the substrate 10. Each of the pixel groups 20 includes six sub-pixels (e.g., R1, G1, B1, R2, G2, B2 in FIG. 2) arranged at intervals in a first direction X, and each of the sub-pixels includes at least one pixel electrode 40 (i.e., 40-1, 40-2, 40-3, 40-4, 40-5, 40-6 in FIG. 2). Each of the data line groups corresponds to the pixel electrode 40 of one of the sub-pixels, and the data line groups are located on one side of the pixel electrodes 40 adjacent to the substrate 10. Each of the data line groups includes two data lines (31 and 32 in FIG. 2) arranged at intervals in the first direction X, and the pixel electrode 40 of each of the sub-pixels is electrically connected to a corresponding data line of the data line groups. Each of the data lines extends along a second direction Y, which is different from the first direction X. Optionally, the first direction X is a horizontal direction, the second direction Y is a vertical direction, and the first direction X and the second direction Y are perpendicular to each other.

In the present embodiments, by arranging the data line groups below the pixel electrodes 40 of the pixel group 20, the DBS electrodes used for shading the data lines in the related art can be removed, so that each pixel electrode can be expanded outwardly to increase the area of the sub-pixel aperture. Further, the aperture rate of the sub-pixel can be significantly improved, thereby solving the problem that the conventional liquid crystal display panel has a limited increase in the aperture rate.

Specifically, with continued reference to FIG. 2, the pixel group 20 is disposed on the substrate 10 which may be a rigid substrate or a flexible substrate. When the substrate 10 is the rigid substrate, a substrate such as a glass substrate may be included. When the substrate 10 is a flexible substrate, a substrate such as a Polyimide (PI) film substrate or an ultra-thin glass film substrate may be included.

Each of the pixel groups 20 includes six sub-pixels (i.e., R1, G1, B1, R2, G2, B2 in FIG. 2) including two first color sub-pixels (B1 and B2 in FIG. 2), two second color sub-pixels (G1 and G2 in FIG. 2), and two third color sub-pixels (R1 and R2 in FIG. 2). The first color sub-pixel and the second color sub-pixel are adjacent to and located between the two third color sub-pixels, e.g., the first color sub-pixel B1 and the second color sub-pixel G1 in FIG. 2 are between the two third color sub-pixels R1 and R2. The first color sub-pixel and the third color sub-pixel are adjacent to and located between the two second color sub-pixels, e.g., the first color sub-pixel B1 and the third color sub-pixel R2 in FIG. 2 are between the two second color sub-pixels G1 and G2. The second color sub-pixel and the third color sub-pixel are adjacent to and located between two first color sub-pixels, e.g., the second color sub-pixel G2 and the third color sub-pixel R2 are between the two first color sub-pixels B1 and B2 in FIG. 2. That is, the three adjacent sub-pixels includes one first color sub-pixel, one second color sub-pixel, and one third color sub-pixel, so that the three adjacent sub-pixels can constitute one pixel.

The first color sub-pixels (B1 and B2 in FIG. 2) are blue sub-pixels, the second color sub-pixels (G1 and G2 in FIG. 2) are green sub-pixels, and the third color sub-pixels (R1 and R2 in FIG. 2) are red sub-pixels. The blue sub-pixels may emit blue light, the green sub-pixels may emit green light, and the red sub-pixels may emit red light. Since every adjacent three sub-pixels are sub-pixels of three colors, the pixel composed of the every adjacent three sub-pixels can emit light of various colors, so that a color display can be realized.

Optionally, the first color sub-pixel, the second color sub-pixel, and the third color sub-pixel are sequentially arranged at intervals in the first direction X. That is, the arrangement order of the six sub-pixels in the first direction X is the first color sub-pixel B2, the second color sub-pixel G2, the third color sub-pixel R2, the first color sub-pixel B1, the second color sub-pixel G1, and the third color sub-pixel R1, as shown in FIG. 2.

The first data line group 30-1, the second data line group 30-2 and the third data line group 30-3 are also provided on the substrate 10 and correspond to partial sub-pixels in the pixel group 20. Each of the three data line groups includes two data lines (31 and 32 in FIG. 2), and thus three data line groups include six data lines connected to six sub-pixels of the pixel group 20, respectively.

Specifically, each of the sub-pixels includes at least one pixel electrode 40, and each data line is electrically connected to the pixel electrode 40 of a corresponding one of the sub-pixels. The data lines are located on the side of the pixel electrode 40 adjacent to the substrate 10, i.e., the data lines are located between the pixel electrodes 40 and the substrate 10. Thus, the data line groups each including the data lines are also located on the side of the pixel electrodes 40 adjacent to the substrate 10, i.e., the data line groups are also located between the pixel electrodes 40 and the substrate 10. Alternatively, the material of the pixel electrode 40 includes a transparent conductive material such as Indium Tin Oxide (ITO).

An orthographic projection of each of the first data line group 30-1, the second data line group 30-2 and the third data line group 30-3 on the substrate 10 is overlapped at least partially with an orthographic projection of a corresponding pixel electrode 40 on the substrate 10. Alternatively, each of the pixel electrodes 40 includes a first backbone electrode 41 extending in a second direction Y, the first data line group 30-1, the second data line group 30-2 and the third data line group 30-3, as well as a corresponding first backbone electrode 41 are arranged correspondingly. The orthographic projection of each of the first data line group 30-1, the second data line group 30-2 and the third data line group 30-3 on the substrate 10 is overlapped at least partially with the orthographic projection of the corresponding first backbone electrode 41 on the substrate 10. Each of the first data line group 30-1, the second data line group 30-2 and the third data line group 30-3, and the corresponding first backbone electrode 41 are arranged correspondingly, so not only the DBS electrodes used for shading the data lines in the related art can be removed, but also the pixel electrodes 40 are expanded outwardly. In this way, the area of the sub-pixel aperture is increased, and the aperture rate of the sub-pixel is increased. Moreover, since the region corresponding to the first backbone electrode 41 is opaque to light, the influence of the data line group on the light output can be reduced or eliminated, and the aperture rate of the sub-pixel can be further improved.

Each of the pixel electrodes 40 further includes a second backbone electrode 42 extending in the first direction X, and branch electrodes 43 extending in different directions from the second backbone electrode 42 and/or the first backbone electrode 41. The second backbone electrode 42 and the first backbone electrode 41 are intersected at a predetermined angle. For example, the second backbone electrode 42 is perpendicular to the first backbone electrode 41, so as to divide the sub-pixel into four domains. The branch electrodes 43 are distributed in the respective domains. Alternatively, the pixel electrode 40 may further include a frame electrode 44 that half-surrounds the first backbone electrode 41, the second backbone electrode 42, and the branch electrodes 43.

It should be noted that only partial branch electrodes 43 of the pixel electrode 40 are illustrated by way of an example in the drawings of the present disclosure, e.g., three branch electrodes 43 are illustrated in each domain in FIG. 2, but the present disclosure is not limited thereto. And, the pixel electrode 40 of some embodiments of the present disclosure may include more or fewer branch electrodes 43. In addition, the embodiments of the present disclosure are described as examples in which each sub-pixel is divided into four domains, but the present disclosure is not limited thereto. And, the sub-pixel of some embodiments of the present disclosure may also be divided into two domains, six domains, eight domains, and the like.

Further, one of the three data line groups is arranged to be corresponding to one of the two first color sub-pixels, and the other two data line groups are arranged to be corresponding to the two second color sub-pixels respectively.

Specifically, the three data line groups 30 include the first data line group 30-1, the second data line group 30-2, and the third data line group 30-3. The first data line group 30-1 corresponds to one of the two first color sub-pixels, and the second data line group 30-2 and the third data line group 30-3 are arranged to be corresponding to the two second color sub-pixels, respectively. Two data lines in each of the data line groups are electrically connected to the pixel electrodes of the two sub-pixels of the same color, respectively, so as to compensate for coupling capacitance between the sub-pixels and to improve longitudinal crosstalk and color deviation.

The two data lines in the first data line group 30-1 are electrically connected to the pixel electrodes in the two second color sub-pixels, respectively. The two data lines in the second data line group 30-2 are electrically connected to the pixel electrodes in the two third color sub-pixels, respectively. The two data lines in the third data line group 30-3 are electrically connected to the pixel electrodes in the two first color sub-pixels, respectively.

Alternatively, the voltage polarities on the two data lines in each data line group are different in order to reduce the coupling effect on the pixel voltages when the data signal changes, and to reduce the risk of longitudinal crosstalk. Specifically, the two data lines in each data line group are a first data line 31 and a second data line 32, and the voltage polarity on the first data line 31 is different from the voltage polarity on the second data line 32. For example, the voltage polarity on the first data line 31 is positive, and the voltage polarity on the second data line 32 is negative. Or, the voltage polarity on the first data line 31 is negative, and the voltage polarity on the second data line 32 is positive.

In order to more clearly describe the connection relationship between the data line and the corresponding sub-pixel, one of two sub-pixels of the same color is designated by a reference sign with "1" suffixed thereto, and the other one of the two sub-pixels of the same color is designated by a reference sign with "2" suffixed thereto. For example, one of the two first color sub-pixels is designated by a reference sign B1 and the other one of the first color sub-pixel is designated by a reference sign B2. Accordingly, one of the two second color sub-pixels is designated by a reference sign G1 and the other second color sub-pixel is designated by a reference sign G2. And, one of the two third color sub-pixels is designated by a reference sign R1 and the other third color sub-pixel is designated by a reference sign R2. The arrangement order of the six sub-pixels in the first direction X on the substrate 10 is the first color sub-pixel B2, the second color sub-pixel G2, the third color sub-pixel R2, the first color sub-pixel B1, the second color sub-pixel G1, and the third color sub-pixel R1.

Meanwhile, a reference sign of the pixel electrode 40 of each sub-pixel is defined. For example, the pixel electrode of the first color sub-pixel B2 is designated by a reference sign 40-6, the pixel electrode of the second color sub-pixel G2 is designated by a reference sign 40-5, the pixel electrode of the third color sub-pixel R2 is designated by a reference sign 40-4, the pixel electrode of the first color sub-pixel B1 is designated by a reference sign 40-3, the pixel electrode of the second color sub-pixel G1 is designated by a reference sign 40-2, and the pixel electrode of the third color sub-pixel R1 is designated by a reference sign 40-1.

Each sub-pixel further includes at least one transistor. The pixel electrode 40 of each sub-pixel is electrically connected to a corresponding transistor. In particular, each pixel electrode 40 further includes a connection electrode 45. The pixel electrode 40 of each said sub-pixel is electrically connected to a corresponding transistor via the connection electrode 45. The transistor is also electrically connected to the corresponding data line. The transistors of ones of the six sub-pixels are located on a first side of the pixel group 20, the transistors of other ones of the sub-pixels are located on a second side of the pixel group 20, and the first side is opposite to the second side. In this way, aperture rates of the sub-pixels are balanced, display uniformity is improved, and all transistors are avoided to be disposed on a side of the pixel group 20 and thus a large difference among the aperture rates of the sub-pixels is further avoided.

Similarly, transistors of each sub-pixel are defined. For example, a transistor of the first color sub-pixel B2 is designated by a reference sign T6, a transistor of the second color sub-pixel G2 is designated by a reference sign T4, a transistor of the third color sub-pixel R2 is designated by a reference sign T2, a transistor of the first color sub-pixel B1 is designated by a reference sign T5, a transistor of the second color sub-pixel G1 is designated by a reference sign T3, and a transistor of the third color sub-pixel R1 is designated by a reference sign T1.

Each of the transistors includes a gate, a source and a drain. Taking a transistor T1 of the third color sub-pixel R1 as an example, the transistor T1 includes a gate GE, a source Si, and a drain D1. Of course, each of the transistors also includes an active layer, not shown.

The array substrate 100 further includes a first gate scan line 51 and a second gate scan line 52 both extending in the first direction X. The first gate scan line 51 is electrically connected to the gates of the transistors on the first side of the pixel group 20, and the second gate scan line 52 is electrically connected to the gates of the transistors on the second side of the pixel group 20. For example, the first gate scan line 51 is electrically connected to the gates of the transistors T3, T4, T5, and T6, and the second gate scan line 52 is electrically connected to the gates of the transistors T1 and T2.

The connection relationship among the pixel group 20 as well as the first data line group 30-1, the second data line group 30-2, and the third data line group 30-3 will be further described with reference to FIG. 2.

Referring to FIG. 2, the pixel electrode 40-6 in the first color sub-pixel B2 is electrically connected to the transistor T6, and the transistor T6 is also electrically connected to the second data line 32 in the third data line group 30-3. The pixel electrode 40-3 in the first color sub-pixel B1 is electrically connected to the transistor T5, and the transistor T5 is also electrically connected to the first data line 31 in the third data line group 30-3. The pixel electrode 40-5 in the second color sub-pixel G2 is electrically connected to the transistor T4, and the transistor T4 is also electrically connected to the second data line 32 in the first data line group 30-1. The pixel electrode 40-2 in the second color sub-pixel G1 is electrically connected to the transistor T3, and the third transistor T3 is also electrically connected to the first data line 31 in the first data line group 30-1. The pixel electrode 40-4 in the third color sub-pixel R2 is electrically connected to the transistor T2, and the transistor T2 is also electrically connected to the second data line 32 in the second data line group 30-2. The pixel electrode 40-1 in the third color sub-pixel R1 is electrically connected to the transistor T1, and the transistor T1 is also electrically connected to the first data line 31 in the second data line group 30-2.

Figure 3:
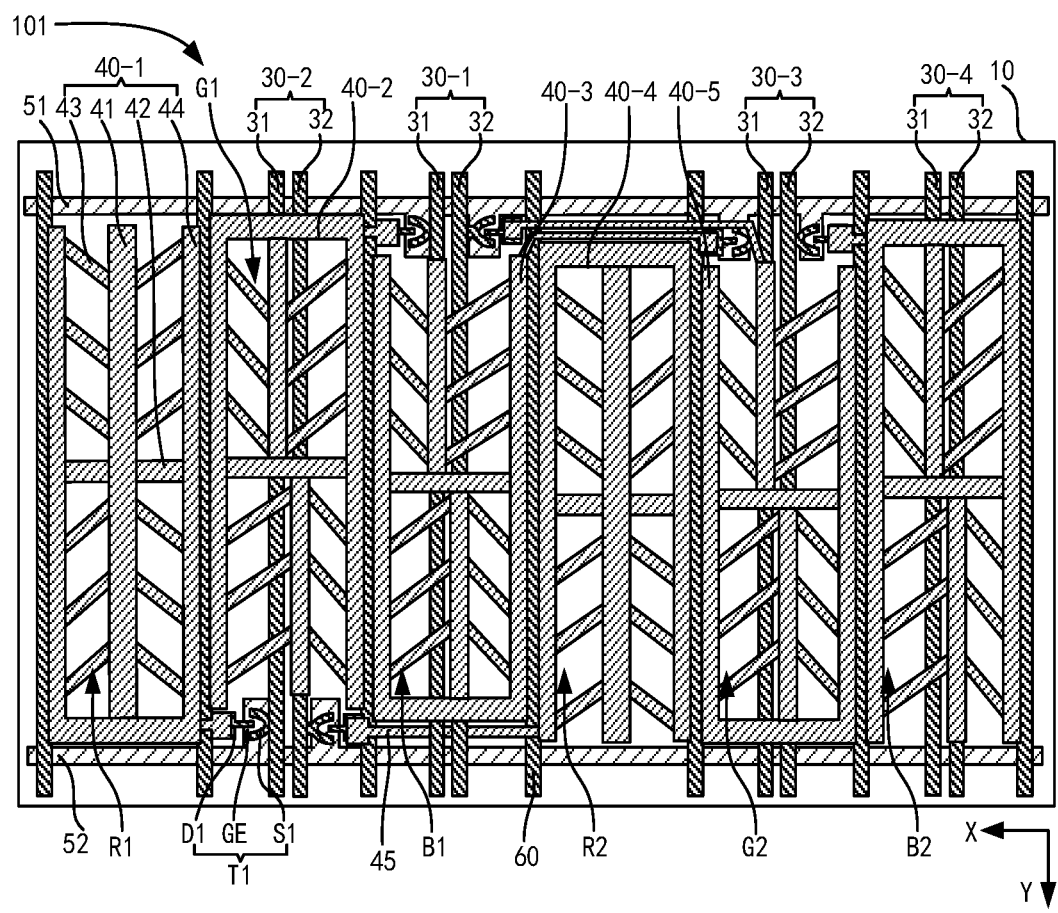
FIG. 3 is another schematic top view of the array substrate according to embodiments of the present disclosure.
Figure 4:
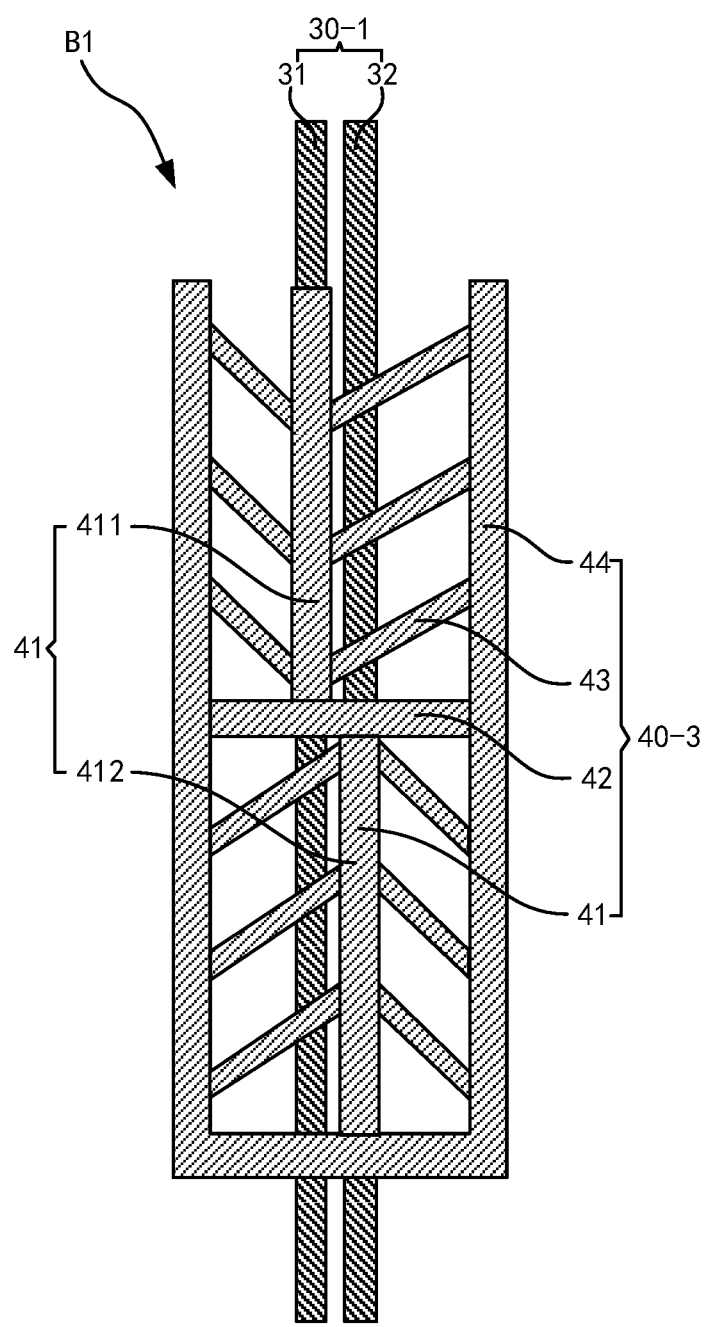
FIG. 4 is a detailed structural diagram of a first color sub-pixel in FIG. 3.

In some embodiments, with reference to FIGS. 1 to 4, FIG. 3 is another schematic top view of an array substrate according to embodiments of the present disclosure. FIG. 4 is a detailed structural diagram of a first color sub-pixel in FIG. 3. In contrast to the above examples, in the array substrate 101 of some embodiments of the present disclosure, the first backbone electrode 41 includes a first sub-portion 411 and a second sub-portion 412, both of which are electrically connected to the second backbone electrode 42. The first sub-portion 411 corresponds to one of the data lines in one data line group. The second sub-portion 412 corresponds to the other one of the two data lines in the one data line group, so as to optimize liquid crystal fit and avoid dark fringes during alignment.

Specifically, with reference to FIGS. 3 and 4, among the sub-pixels provided with the data line groups, the first backbone electrode 41 of the pixel electrode includes two parts. For example, the pixel electrode 40-3 of the first color sub-pixel B1 corresponds to the first data line group 30-1. As shown in FIG. 4, the first backbone electrode 41 includes a first sub-portion 411 corresponding to the first data line 31 in the first data line group 30-1, and a second sub-portion 412 corresponding to the second data line 32 in the first data line group 30-1.

In addition, in the present embodiments, the array substrate 101 further includes multiple common electrode lines 60 extending in the second direction Y. The common electrode lines 60 are disposed in the same layer as the data line groups. That is, the common electrode lines 60 are disposed in the same layer as each of the data lines. Further, the common electrode line 60 is arranged correspondingly at a gap between two adjacent sub-pixels. For example, the common electrode line 60 is arranged correspondingly at a gap between the third color sub-pixel R2 and the first color sub-pixel B1, as shown in FIG. 3. In this way, compared with the pixel structure in FIG. 1, the common electrode CE of the same layer as the gate scan line GL in the related art can be removed by transferring the data lines, so that the coupling effect on the common voltage when the data signal changes can be reduced, the lateral crosstalk risk can be reduced, and the image quality can be further improved.

It should be noted that, a term "same layer arrangement" in embodiments of the present disclosure means that, in a manufacturing process, a film layer formed of the same material is patterned to obtain at least two different structures; and then the at least two different structures are provided in the same layer. For example, if the data lines and the common electrode lines 60 of the present embodiments are obtained by patterning the same conductive film layer, the data lines and the common electrode lines 60 are arranged in the same layer.

Alternatively, with continued reference to FIG. 3, the array substrate 101 further includes a fourth data line group 30-4, which is provided in correspondence with the other one of the two first color sub-pixels. For example, the fourth data line group 30-4 is provided in correspondence with the first color sub-pixel B2, and the first data line group 30-1 is provided in correspondence with the first color sub-pixel B1. The fourth data line group 30-4 has the same structure as the first data line group 30-1, so that the apertures of the two first color sub-pixels are kept uniform so as to reduce color deviation. The data lines in the fourth data line group 30-4 are dummy signal lines and are not electrically connected to the sub-pixels. For other description, refer to the above-mentioned embodiments, and details are not described herein.

Figure 5:
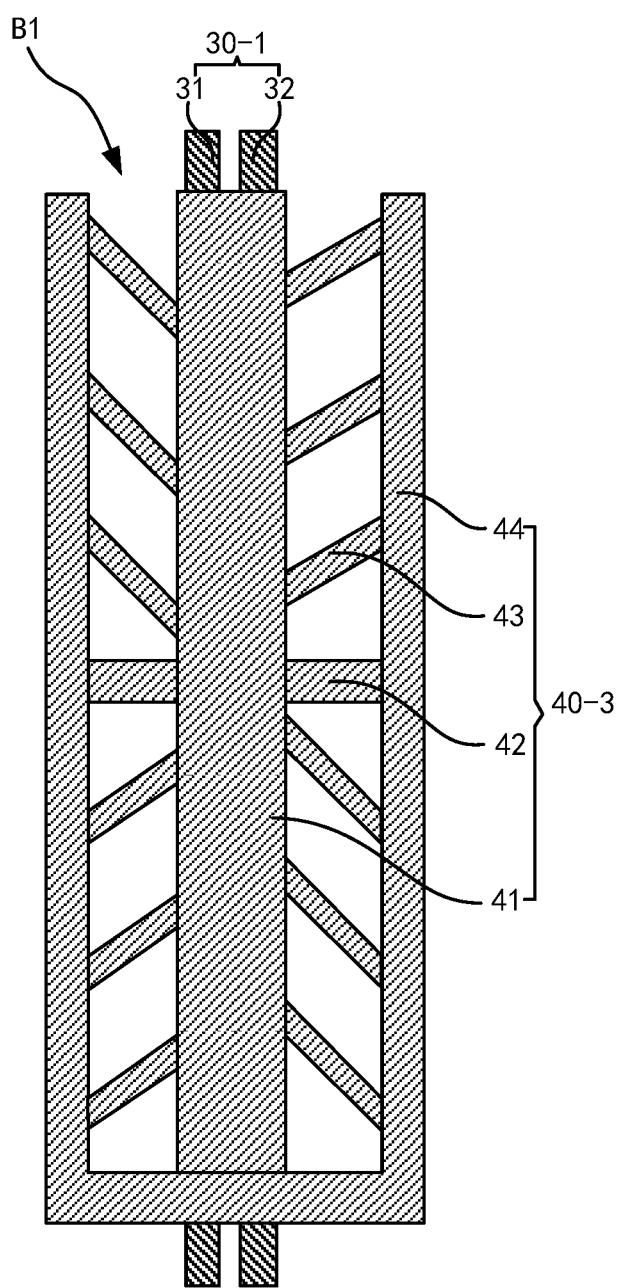
FIG. 5 is another detailed structural diagram of the first color sub-pixel according to embodiments of the present disclosure.
Figure 6:
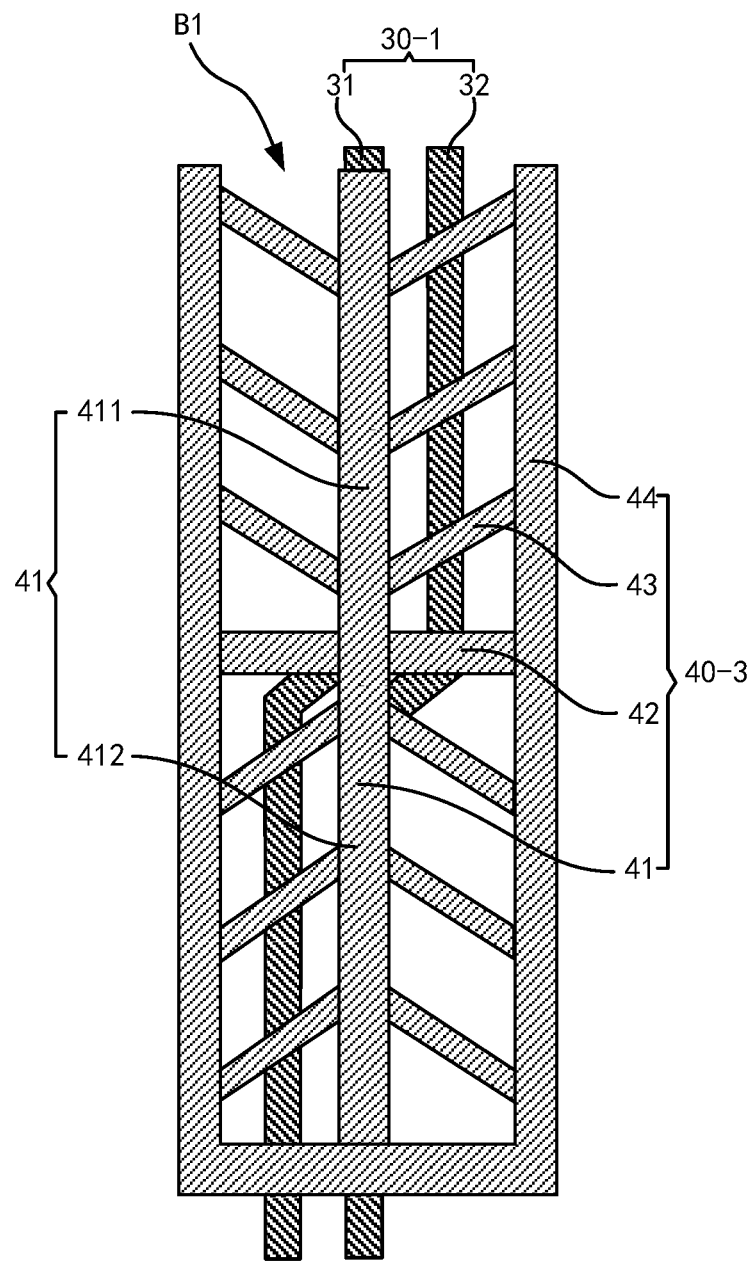
FIG. 6 is yet another detailed structural diagram of the first color sub-pixel according to embodiments of the present disclosure.
Figure 7:
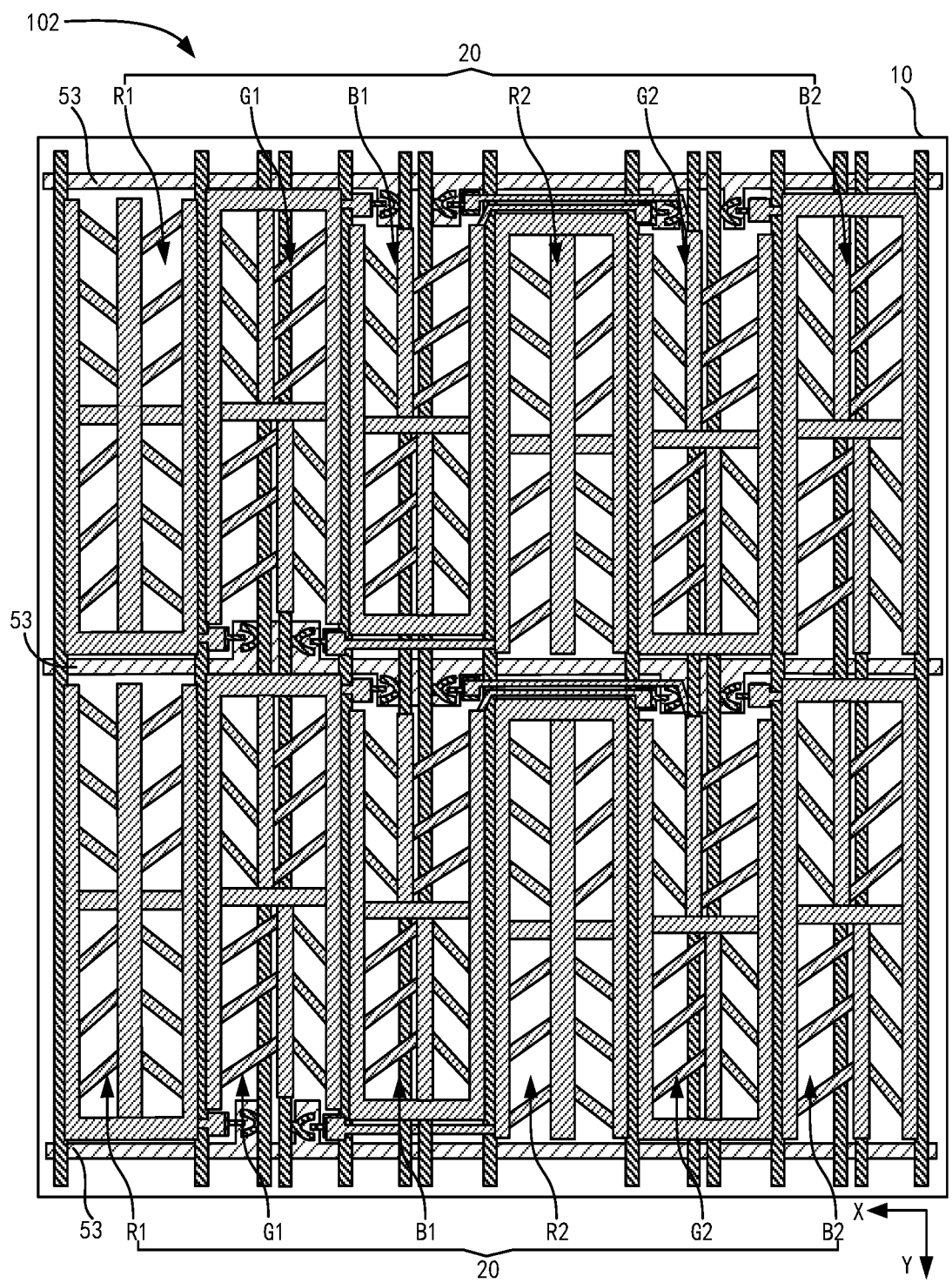
FIG. 7 is another schematic top view of the array substrate according to embodiments of the present disclosure.
Figure 8:
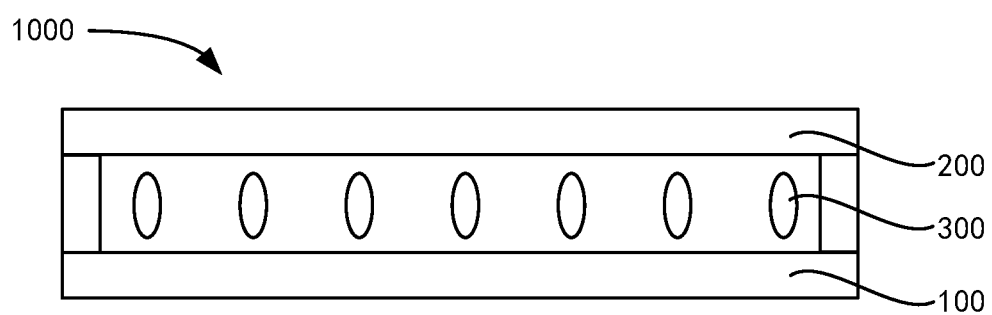
FIG. 8 is a schematic sectional view of a display panel according to embodiments of the present disclosure.

In other embodiments, the first backbone electrode 41 and the first data line group 30-1 may also employ the structures shown in FIGS. 5 and 6 in order to avoid dark fringes during alignment. FIG. 5 is another detailed structural diagram of a first color sub-pixel according to embodiments of the present disclosure, and FIG. 6 is yet another detailed structural diagram of the first color sub-pixel according to embodiments of the present disclosure. Referring to FIG. 5, the orthographic projection of the first backbone electrode 41 on the substrate 10 covers the orthographic projection of the corresponding data line group on the substrate 10. Referring to FIG. 6, both of the data lines in the data line group are of polyline shapes.

Specifically, taking the pixel electrode 40-3 of the first color sub-pixel B1 as an example, the pixel electrode 40-3 of the first color sub-pixel B1 corresponds to the first data line group 30-1. As shown in FIG. 5, the orthographic projection of the first backbone electrode 41 of the pixel electrode 40-3 on the substrate 10 covers the orthographic projection of the first data line group 30-1 on the substrate 10. That is, a width of the first backbone electrode 41 is larger than a sum of widths of the first data line 31 and the second data line 32 in the first data line group 30-1.

Referring to FIG. 6, the first backbone electrode 41 of the pixel electrode 40-3 includes a first sub-portion 411 and a second sub-portion 412, which coincide in the second direction Y. That is, the first sub-portion 411 and the second sub-portion 412 are arranged in a straight line. The first data line 31 in the first data line group 30-1 is of a polyline shape, and a part of the first data line 31 is arranged to be corresponding to the first sub-portion 411, and the other part of the first data line 31 is located between the first sub-portion 411 and the frame electrode 44. That is, the part of the first data line 31 is covered by the first sub-portion 411, and the other part of the first data line 31 is not covered by the first sub-portion 411. Accordingly, the second data line 32 in the first data line group 30-1 is also of a polyline shape. A part of the second data line 32 is arranged to be corresponding to the second sub-portion 412, and the other part of the second data line 32 is provided between the second sub-portion 412 and the frame electrode 44. That is, a part of the second data line 32 is covered by the second sub-portion 412, and the other part of the second data line 32 is not covered by the second sub-portion 412. For other description, refer to the above-mentioned embodiments, and details are not described herein.

In some embodiments, with reference to FIGS. 1-7, FIG. 7 is another schematic top view of an array substrate according to embodiments of the present disclosure. In contrast to the above embodiments, in the array substrate 102 of the present embodiments, there is multiple pixel groups 20, and the multiple the pixel groups 20 are arranged at intervals along the second direction Y. The array substrate 102 further includes a third gate scan line 53 extending in the first direction X. The third gate scan line 53 is shared by two adjacent pixel groups 20 to reduce the number of gate scan lines. For other description, refer to the above-mentioned embodiments, and details are not described herein.

Based on the same inventive concept, embodiments of the present disclosure further provide a display panel. Referring to FIGS. 1 to 8, FIG. 8 is a cross-sectional structural diagram of a display panel according to embodiments of the present disclosure. The display panel 1000 includes an array substrate 100 of one of the foregoing embodiments. The display panel 1000 further includes a CF substrate 200 disposed to be opposite to the array substrate 100, and liquid crystal molecules 300 sandwiched between the array substrate 100 and the CF substrate 200.

From above embodiments, it can obtain the follows.

Some embodiments of the present disclosure provide an array substrate and a display panel. The array substrate includes a substrate and at least one pixel group and at least three data line groups disposed on the substrate. Each of the pixel groups including six sub-pixels arranged at intervals in a first direction. Each of the six sub-pixels includes at least one pixel electrode. Each of the three data line groups corresponds to the pixel electrode of one of the sub-pixels. The data line groups are located on one side of the pixel electrode which is adjacent to the substrate. Each of the data line groups includes two data lines arranged at intervals in the first direction. The pixel electrode of each of the sub-pixels is electrically connected to one data line. According to embodiments of the present disclosure, by arranging data lines below pixel electrodes, DBS electrodes can be removed, so that aperture rates of sub-pixels can be significantly improved, thereby solving a technical problem that an aperture rate of an existing liquid crystal display panel is limited to be improved.

In the above-mentioned embodiments, the description of each embodiment has its own emphasis, and parts not described in detail in a certain embodiment may be referred to the related description of other embodiments.

The principles and embodiments of the present disclosure are described herein by using specific examples. The foregoing description of the embodiments is merely intended to assist in understanding the technical solution of the present disclosure and the core concepts thereof. It will be appreciated by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the embodiments of the present disclosure.

What is claimed is:

1. An array substrate comprising:
   a substrate; and
   at least one pixel unit comprising:
   at least one pixel group disposed on the substrate, each of the at least one pixel group comprising six sub-pixels arranged at intervals in a first direction, and each of the six sub-pixels comprising at least one pixel electrode; and
   at least three data line groups disposed on the substrate, the at least three data line groups comprising three data line groups, each of the three data line groups corresponding to the at least one pixel electrode of one of the six sub-pixels, and each of the three data line groups being located on one side of the at least one pixel electrode which is adjacent to the substrate;
   wherein each of the three data line groups comprises two data lines arranged at intervals in the first direction, and the at least one pixel electrode of each of the six sub-pixels is electrically connected to a respective one of the two data lines of a corresponding one of the three data line groups;
   wherein the six sub-pixels comprise two first color sub-pixels, two second color sub-pixels, and two third color sub-pixels: one of the three data line groups and one of the two first color sub-pixels are arranged correspondingly, other two of the three data line groups and the two second color sub-pixels are arranged correspondingly respectively, and the two data lines of each of the three data line groups are each electrically connected to the at least one pixel electrode of a corresponding one of two, which are of a same color, of the six sub-pixels.

2. The array substrate according to claim 1, wherein each of the at least one pixel electrode comprises a first backbone electrode extending in a second direction, and the first backbone electrode and a corresponding one of the three data line groups are disposed oppositely.

3. The array substrate according to claim 2, wherein an orthographic projection of the first backbone electrode on the substrate covers an orthographic projection of the corresponding one of the three data line groups on the substrate.

4. The array substrate according to claim 2, wherein the first backbone electrode comprises:
   a first sub-portion corresponding to one of the two data lines of the corresponding one of the three data line groups; and
   a second sub-portion corresponding to an other one of the two data lines of the corresponding one of the three data line groups.

5. The array substrate according to claim 4, wherein each of the at least one pixel electrode further comprises a second backbone electrode extending in the first direction, and the first sub-portion and the second sub-portion are both electrically connected to the second backbone electrode.

6. The array substrate according to claim 4, wherein the two data lines of each of the three data line groups are of polyline shapes.

7. The array substrate according to claim 1, wherein each of the six sub-pixels further comprises at least one transistor electrically connected to the at least one pixel electrode of a respective one of the six sub-pixels, the at least one transistor is electrically connected to a respective one of the two data lines of a corresponding one of the three data line groups;

for each of the at least one pixel group, the at least one transistor of each of ones of the six sub-pixels is located on a first side of the pixel group, and the at least one transistor of each of other ones of the six sub-pixels is located on a second side of the pixel group, and the first side is opposite to the second side.

8. The array substrate according to claim 7, further comprising a first gate scan line and a second gate scan line extending in the first direction, wherein the first gate scan line is electrically connected to a gate of the at least one transistor of each of the ones of the six sub-pixels on the first side, and the second gate scan line is electrically connected to a gate of the at least one transistor of each of the other ones of the six sub-pixels on the second side.

9. The array substrate according to claim 7, wherein the at least one pixel group comprises a plurality of pixel groups arranged at intervals in a second direction; the array substrate further comprises third gate scan lines extending in the first direction, and every adjacent two of the plurality of pixel groups share one of the third gate scan lines.

10. The array substrate according to claim 1, further comprising a plurality of common electrode lines extending in a second direction, wherein the plurality of common electrode lines are disposed in a same layer as the two data lines of each of the three data line groups, and each of the common electrode lines is disposed a gap between every adjacent two of the six sub-pixels.

11. An array substrate, comprising:
a substrate; and
at least one pixel unit comprising:
at least one pixel group disposed on the substrate, each of the at least one pixel group comprising six sub-pixels arranged at intervals in a first direction, and each of the six sub-pixels comprising at least one pixel electrode; and
at least three data line groups disposed on the substrate, the at least three data line groups comprising three data line groups, each of the three data line groups corresponding to the at least one pixel electrode of one of the six sub-pixels, and each of the three data line groups being located on one side of the at least one pixel electrode which is adjacent to the substrate;
wherein each of the three data line groups comprises two data lines arranged at intervals in the first direction, and the at least one pixel electrode of each of the six sub-pixels is electrically connected to a respective one of the two data lines of a corresponding one of the three data line groups;
wherein the six sub-pixels comprise two first color sub-pixels, two second color sub-pixels, and two third color sub-pixels: one of the three data line groups and one of the two first color sub-pixels are arranged correspondingly, other two of the three data line groups and the two second color sub-pixels are arranged correspondingly respectively, and the two data lines of each of the three data line groups are each electrically connected to the at least one pixel electrode of a corresponding one of two, which are of a same color, of the six sub-pixels;
wherein voltage polarities of the two data lines of each of the three data line groups are different.

12. The array substrate according to claim 1, wherein the two first color sub-pixels are blue sub-pixels, the two second color sub-pixels are green sub-pixels, and the two third color sub-pixels are red sub-pixels; the three data line groups comprise a first data line group, a second data line group, and a third data line group; the first data line group and one of the two first color sub-pixels are arranged correspondingly; the second data line group and the third data line group, and the two second color sub-pixels are arranged correspondingly respectively; the two data lines of the first data line group are each electrically connected to the at least one pixel electrode of a corresponding one of the two second color sub-pixels, the two data lines of the second data line group are each electrically connected to the at least one pixel electrode of a corresponding one of the two third color sub-pixels, and the two data lines of the third data line group are each electrically connected to the at least one pixel electrode of a corresponding one of the two first color sub-pixels.

13. The array substrate according to claim 12, wherein one of the two first color sub-pixels and one of the two second color sub-pixels are adjacent to the two third color sub-pixels and located between the two third color sub-pixels, the one of the two first color sub-pixels and one of the two third color sub-pixels are adjacent to the two second color sub-pixels and located between the two second color sub-pixels; an other one of the two second color sub-pixels and the one of the two third color sub-pixels are adjacent to the two first color sub-pixels and located between the two first color sub-pixels;
for each of the two first color sub-pixels, each of the two second color sub-pixels and each of the two third color sub-pixels, the first color sub-pixel, the second color sub-pixel, and the third color sub-pixel are sequentially arranged at intervals in the first direction.

14. The array substrate according to claim 13, wherein the at least three data line groups further comprise a fourth data line group, the fourth data line group and an other one of the two first color sub-pixels are arranged correspondingly, and the fourth data line group has a same structure as the first data line group.

15. A display panel comprising an array substrate, the array substrate comprising:
a substrate; and
at least one pixel unit comprising:
at least one pixel group disposed on the substrate, each of the at least one pixel group comprising six sub-pixels arranged at intervals in a first direction, and each of the six sub-pixels comprising at least one pixel electrode; and
at least three data line groups disposed on the substrate, the at least three data line groups comprising three data line groups, each of the three data line groups corresponding to the at least one pixel electrode of one of the six sub-pixels, and each of the three data line groups being located on one side of the at least one pixel electrode which is adjacent to the substrate;
wherein each of the three data line groups comprises two data lines arranged at intervals in the first direction, and the at least one pixel electrode of each of the six sub-pixels is electrically connected to a respective one of the two data lines of a corresponding one of the three data line groups,
wherein the six sub-pixels comprise two first color sub-pixels, two second color sub-pixels, and two third color sub-pixels: one of the three data line groups and one of the two first color sub-pixels are arranged correspondingly, other two of the three data line groups and the two second color sub-pixels are arranged correspondingly respectively, and the two data lines of each of the three data line groups are each electrically connected to the at least one pixel electrode of a corresponding one of two, which are of a same color, of the six sub-pixels.

16. The display panel according to claim 15, wherein each of the at least one pixel electrode comprises a first backbone electrode extending in a second direction, and the first backbone electrode and a corresponding one of the three data line groups are disposed oppositely.

17. The display panel according to claim 16, wherein an orthographic projection of the first backbone electrode on the substrate covers an orthographic projection of the corresponding one of the three data line groups on the substrate.

18. The display panel according to claim 16, wherein the first backbone electrode comprises:
- a first sub-portion corresponding to one of the two data lines of the corresponding one of the three data line groups; and
- a second sub-portion corresponding to an other one of the two data lines of the corresponding one of the three data line groups.

19. The display panel according to claim 18, wherein each of the at least one pixel electrode further comprises a second backbone electrode extending in the first direction, and the first sub-portion and the second sub-portion are both electrically connected to the second backbone electrode.

20. The display panel according to claim 18, wherein the two data lines of each of the three data line groups are of polyline shapes.

* * * * *